Oct. 4, 1955   P. H. DURST ET AL   2,719,545
APPARATUS FOR MAKING MOUNTS FOR TUBULAR LAMPS
Filed June 30, 1951   3 Sheets-Sheet 1
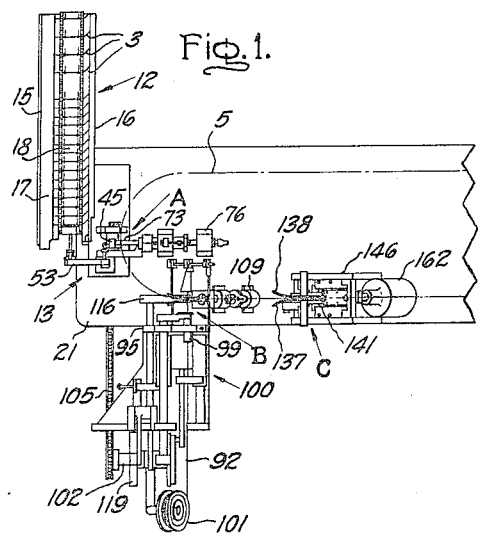
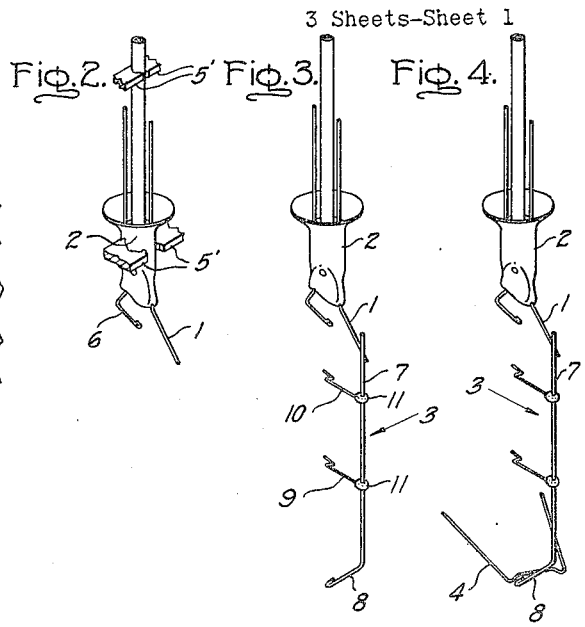
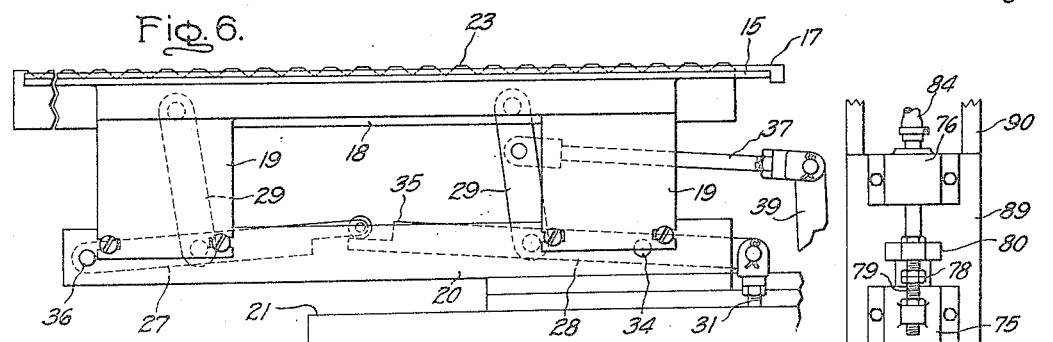
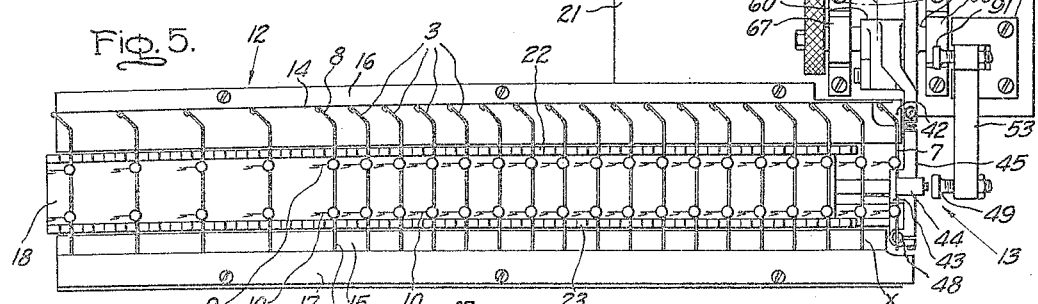
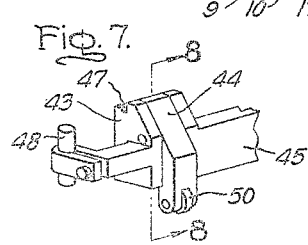
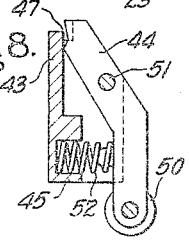
Inventors:
Paul H. Durst,
Robert D. Johnson,
by Vernet C. Kauffman
Their Attorney.

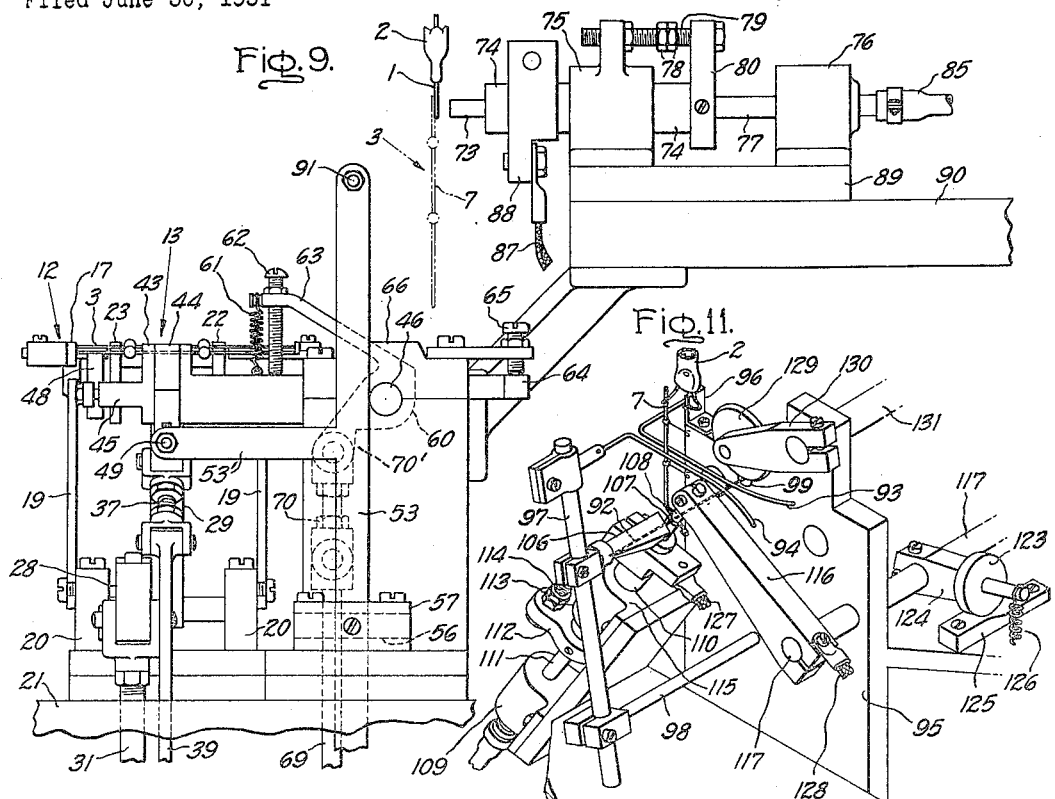

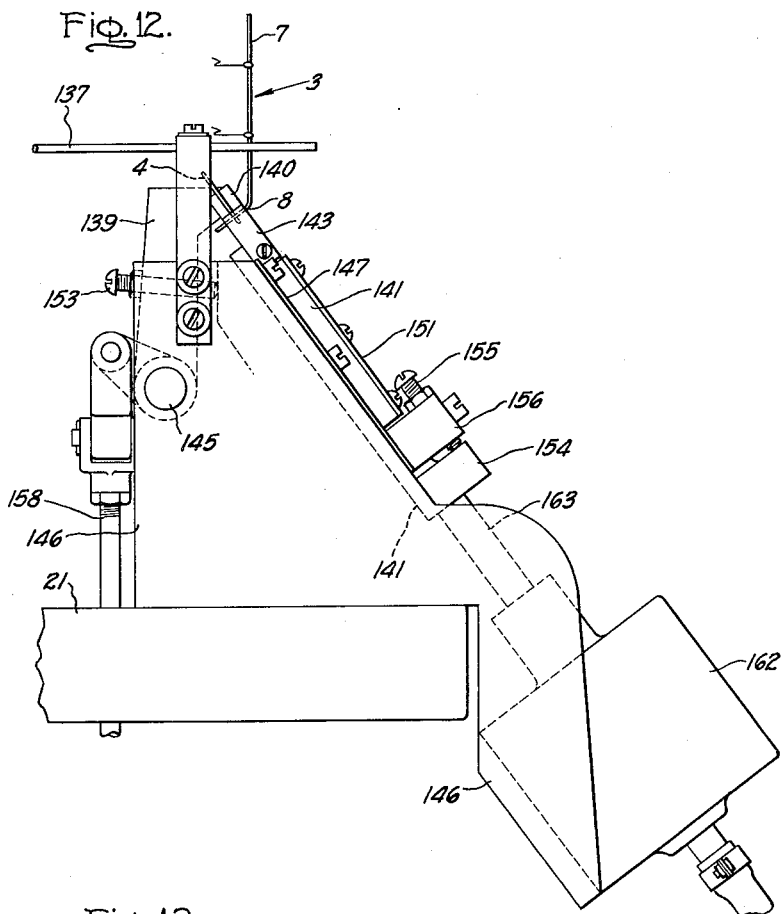
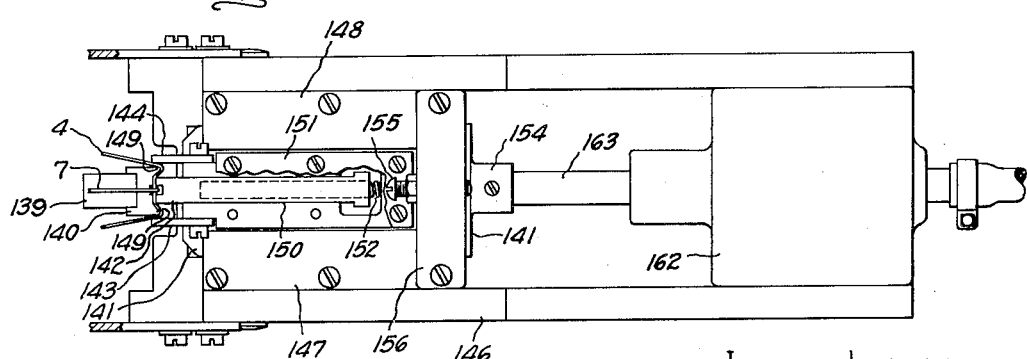

United States Patent Office 2,719,545
Patented Oct. 4, 1955

2,719,545

APPARATUS FOR MAKING MOUNTS FOR TUBULAR LAMPS

Paul H. Durst and Robert D. Johnson, Cleveland, Ohio, assignors to General Electric Company, a corporation of New York Application June 30, 1951, Serial No. 234,628

16 Claims. (Cl. 140—71.6)

Our invention relates to apparatus for making so-called "mounts," or filament supporting structures, for electric lamps, discharge tubes and the like. More particularly, our invention relates to apparatus for making automatically the extended mount structures for relatively long tubular incandescent lamps.

One object of our invention is to provide apparatus for arranging the relatively long and complex mount assembly (comprising a preformed wire stay and beaded support wires projecting therefrom) at proper relation to a lamp stem, and to weld the stay wire to a leading-in wire extending from said stem.

Another object of our invention is to provide in apparatus for attaching relatively long and complex mount assemblies to stems, mount assembly gripping means and an electrode in the form of a single movable unit adapted, through cooperative function, to transfer and weld a mount assembly properly on a leading-in wire of a stem. Such apparatus facilitates the ready arrangement of the mount assembly at proper relation to the stem and the welding of said assembly to the leading-in wire thereof, with a minimum of attention. It is preferred that still other means be provided in combination with the transferring and welding means for assisting in the manual insertion of the mount assemblies therein and in the presentation of said assemblies to said means at the initiation of each cycle of operation.

Still another object of our invention is to provide automatically operated apparatus for welding a mount assembly for tubular lamps to the leading-in wire of a stem and to thereafter weld a wire brace thereto and to form the wire brace to a suitable shape to engage the bulb of the lamp.

Still another object of our invention is to provide apparatus for first attaching a mount assembly to a stem and then attaching and forming a wire brace on the mount assembly which apparatus is characterized by its ability to be arranged at a succession of work stations along the path of movement of a carrier for the stem and to be operated from a single source in timed relation to the movements of said carrier. Apparatus of this kind has particular utility in that it can be incorporated in other stem and mount making apparatus and can perform its particular operations on the stem without requiring a transfer of the stem to a second holder or carrier. However, to be suitable for operation with a movable stem carrier, the apparatus must be adapted to operate at the position at which the stem is held and to be such as to retract from the path of movement of the stem mount assembly between stations.

Our apparatus provides for the successive attachment of mount assemblies, each comprising a wire stay having one end angularly offset and having insulating beads with fine support wires at intermediate points therealong, to a leading-in wire extending from a stem, and is particularly featured by means for retaining a reserve supply of mount assemblies in the course of being fed, and means to assist the proper insertion and arrangement of said assemblies in said reserve supply. The mount assemblies are advanced step-by-step along the top of a table upon which they are placed by the operator and are moved (by transferring means) from a horizontal position on the table to a proper vertical position with relation to a stem at one of the work stations of a stem carrier. An electrode mounted on and moved with the transferring means, and a second movable electrode located on the opposite side of the path of movement of the carrier and stem, close on the adjacent parts of the wire stay of the mount assembly and the leading-in wire of the stem to weld them together.

Further operations of our apparatus occur at a second station taken by the stem, at which station a wire brace is fed across the path of movement of the stem and into proper relation to a portion of the stay, and electrodes are moved against the adjacent portions of the brace and stay from opposite sides to weld them together. One electrode is located within a vertical plane through the path of movement of the stay and is moved upward to the welding position, whereas the other electrode is first moved into said plane and is then moved down to the welding position. The brace is formed to the proper shape at a succeeding station by a die moving up against said brace and a second die moving first up to a position opposite the first die and then down against the said brace.

Still other objects and features of our invention will appear from the following detailed description of a preferred embodiment, and from the drawing.

In the drawing, Fig. 1 is a plan view of one species of apparatus comprising our invention, the apparatus being located at work stations along the course of movement of a stem carrier; Figs. 2, 3 and 4 are perspective views of a lamp stem at various stages in the attachment of the mount assembly and brace thereto by the apparatus; Fig. 5 is a plan view of the mount assembly advancing, transferring and welding means of the apparatus, which means are located at work station A of the stem carrier; Fig. 6 is a side elevation of the mount assembly advancing means; Figs. 7 and 8 are, respectively, perspective and sectional views, the latter taken along line 8—8 of Fig. 7 in the direction indicated, of the jaws of the mount assembly transferring means; Fig. 9 is an end view of the mount assembly advancing, transferring and welding means with a mount assembly indicated in dot-dash lines at the position it is placed on the leading-in wire of a stem; Fig. 10 is a diagrammatic perspective view of the cams and associated driving means for the apparatus; Fig. 11 is a perspective view of the brace feeding and welding means located at work station B and Figs. 12 and 13 are side and oblique views of the brace forming means located at work station C.

The function of the disclosed apparatus is to mount upon the leading-in wire 1 of the stem 2 (Fig. 2) the mount assembly 3 (Fig. 3) and the brace 4 (Fig. 4) and to effect these operations during the course of movement of said stem 2 along the path indicated by the dot-dash line 5 and including work stations A, B and C. In a preferred combination of apparatus, the stem 2 is supported by a carrier (only the jaws 5' of which appear in Fig. 2) which is a part of stem and mounting apparatus, in the manner of that disclosed in Patent 1,907,532, Flaws, of May 9, 1933, and which provides for the advance of said stem 2 in a series of indexing movements arranging it at each of the work stations A, B and C in turn for like intervals. The stem 2 is held in the vertical position shown in Fig. 2 and is orientated so that the leading-in wires 1 and 6 lie along the course of the movement with the lowermost portion of leading-in wire 1 at a definite position to one side of said stem 2.

The mount assembly 3, which is welded to the leading-in wire 1 at station A, is introduced into the apparatus in the form it appears in Fig. 3, and is composed of a wire stay 7 having an end portion 8 extending angularly from the main portion thereof and having fine support wires 9 and 10 extending laterally from insulating beads 11 in a plane including portion 8 and at spaced intervals along said main portion. Introduction of the mount assembly 3 is effected by an operator situated opposite the end of the table 12 adjacent station A and consists in placing mount assemblies 3 successively on the top surface of said table 12 in a manner which enables said assemblies 3 to be advanced into the apparatus at proper intervals. The table 12 and associated means are elements of a rack type feed for advancing the mount assemblies 3 to transferring means 13 which, in turn, carries said mount assemblies 3 to proper relation to stems 2 presented at station A and provides for the presentation of a mount assembly 3 to the transferring means 13 during each cycle of its operation and advance of a stem 2 to station A. The mount assemblies 3 located upon the table 12 provide a reserve for periods during which the operator may be required to perform some other duty around the machine and are advanced along the length of the table 12 in steps, each timed with the cycle of operation of the transferring means. The gradual advance of the mount assemblies 3 clears the end portion of the table 12 nearest the operator so that said operator normally faces a portion of the table 12 upon which said mount assemblies 3 may be placed.

The operation of introducing the mount assemblies 3 into the apparatus consists of resting the bent end portion 8 (Fig. 5) of the stay 7 upon the flat upper surface of one side 14 of the tbale 12 and in resting the opposite end of said stay 7 upon the flat upper surface of the other side 15 thereof. The mount assembly 3 is placed as near the preceding assembly 3 on the table 12 as possible without causing them to touch and must be positioned lengthwise so that the opposite ends fall between the guide rails 16 and 17. The orientation of the mount assemblies 3 must also be such that the bent end 8 of the stay 7 and the support wires 9 and 10 project toward the rear of the table 12. The advance of the mount assemblies 3 is effected by the movements of a floating carriage 18, located between the table sides 14 and 15 which have fixed positions upon uprights 19 (Fig. 6) fastened to bars 20 on the bed 21 of the machine, and is initiated by a rising movement of the carriage 18 which causes said assemblies 3 to be lifted from the table 12 by the racks 22 and 23 at opposite sides of said carriage 18. Relatively large V notches in the edges of the racks 22 and 23 position the mount assemblies 3 and cause them to be advanced with said racks 22 and 23 in the next movement of the carriage 18 which moves it toward the transferring means 13. This latter motion of the carriage 18 advances the mount assemblies 3 a distance equivalent to their spacing upon the table 12 and is followed by a lowering movement of the carriage 18 which again rests the mount assemblies 3 upon the sides 14 and 15 of the table 12, but at a more advanced position. A retraction motion in the carriage 18 while it is below the top surface of the sides 14 and 15 of the table 12 returns said carriage 18 to the position it appears in the drawings and at the start of the cycle of operation. At such times the most advanced mount assembly 3 is resting partly on the table 12 and on the transferring means 13 and is in position to be picked up and advanced by said means 13.

The movements of the carriage 18 of the advancing means, like all other operations of the apparatus, must be timed with the presentation of stem 2 at the work station A and can, most conveniently, be brought about by driving means also common to the carrier for advancing said stem 2 as disclosed in Patent 1,907,582 hereinbefore referred to. The shaft 24, Fig. 10, represents driving means of that kind and by its constant rate of rotation effects a single rotation of cams 25 and 26 to impart the vertical and horizontal motions, respectively, to the carriage 18. The vertical motion of the carriage 18 results from a rocking movement in the levers 27 and 28 located below and connected to the opposite ends thereof by the links 29—29, and is initiated by a variation in the cam 25 being turned into engagement with the roller 30 on the lower end of push rod 31 connected to the lever 28. Variations in the periphery of the cam 25 effect vertical movement of the push rod 31 in the fixed guide 32 (only partially shown) against the compression force of spring 33 and cause the lever 28 to turn about a pivot pin 34 carried by the side bars 20—20. This same motion of lever 28 is transferred to lever 27 through an extending end 35 of lever 28 which forms a rest for the end of lever 27 and turns said lever 27 about the pivot pin 36 which is correspondingly supported by the side bars 20—20. The horizontal motion of the carriage 18 results from a rocking motion imparted to the link 29 at the forward end of said carriage 18 by the rod 37 which motion is initiated when a variation in the cam 26 passes under the roller 38 of a lever 39 connected to the opposite end of said rod 37. The variation in the cam 26 effects a rocking motion of the lever 39 about a pivot pin 40 in a stationary bracket (not shown) which motion is transferred through the rod 37 to the link 29 and the carriage 18. A spring 41, connected between the upper end of the lever 39 and a portion of the bed 21 of the machine, biases said lever 39 toward the cam 26 so that the roller 38 remains on the edge thereof at all times. These movements of the advancing means finally carry the mount assembly 3 to the furthermost point of advance of the notched portion of the rails 22 and 23 of the carriage 18 at which time said mount assembly 3 is located at the position designated as "x" in Fig. 5. The next cycle of operation causes the end of the carriage 18 to push the mount assembly 3 along the table 12 to the extent that it falls onto the recessed ledge or rest 42 at the front end of the table 12 and between the open jaws 43 and 44 of the supporting arm 45 of the transfer means 13.

The next operation in the order of those having to do with the mount assembly 3 is performed by the transferring means 13 (Figs. 5 and 9) and is the first step in the movement of said mount assembly 3 from a horizontal position on the end of table 12 to a vertical position at proper relation to the leading-in wire 1 of a stem 2 at station A. The mount assembly 3 is transferred by the movements of the arm 45 and the supporting shaft 46 therefor which motion swings said arm 45 from a horizontal position opposite the end of the table 12 to an upright position directly above said shaft 46.

At the start of the cycle, the mid-portion of the stay 7 lies in the slot 47 (Figs. 7 and 8) in the fixed jaw 43 of the arm 45; and the end of said stay 7 opposite the bent end 8, which is still located on the ledge 42 of the table 12, is resting on a welding electrode 48 on the end portion of said arm 45. The mount assembly 3 is, accordingly, at a definite position within the transferring means 13 and is held at this position when the movable jaw 44 is caused to close against the stay 7 to grip it tightly against the fixed jaw 43. This movement of the jaw 44 is the result of the withdrawal of the end of the stud 49 of the operating means from engagement with the roller 50 on the lower end of said jaw 44 with resulting rotation of said jaw 44 about the pin 51 due to expansion of the helical spring 52 located between said lower end and the arm 45.

Other parts of the jaw opening means consist of the lever 53 which carries the stud 49 on a horizontally extending arm portion 53' thereof, and which also carries a roller 54 (Fig. 10) on a vertically extending arm portion thereof below the bed 21 of the machine and in engagement with the edge of a cam 55 on the main drive shaft 24. The timed operation of the closing movement of the jaws 44 occurs when a smaller diameter portion of the cam 55 is advanced into engagement with the roller 54 and the lever 53 is swung about a pivot pin 56 in the bracket 57 on the bed 21 of the machine by the contraction force of a helical spring 58 connecting the lower end of lever 53 and a portion of the bed of the machine.

The transferring motion of the arm 45 is a swinging motion of substantially 90 degrees about the axis of the shaft 46 and is introduced in said arm 45 from operating means actuated by a cam 59 on the main drive shaft 24 and including the free turning collar 60 adjacent said arm 45 on the shaft 46. A resilient coupling comprised of a helical spring 61 and screw 62 interconnecting an intermediate portion of the arm 45 and an extending arm 63 of the collar 60 provides the means of carrying the motion of said collar 60 to the transfer arm 45. The resiliency of the coupling permits an excess of movement in the operating means, and permits the transfer arm 45 to be controlled independently by stops at the two positions thereof. The transfer arm 45 moves from a horizontal position, where the heel 64 thereof bears against the stationary stop screw 65, to a second position where said heel 64 bears against another corresponding stop screw (not shown) mounted between the bearing blocks 66 and 67 for shaft 46.

The transfer of motion to the collar 60 is effected when the cam 59 is turned so that a variation therein passes into engagement with the roller 68 on the lower end of the push rod 69 and the resulting vertical motion in said push rod 69 is transferred through the linkage 70 to a second arm 70' extending from the collar 60. A bracket 71 (only partially shown) maintains the push rod 69 at definite position over the cam 59 at all times, whereas, a helical compression spring 72, located about a lower portion of said push rod 69 and bearing against a collar 73' thereon and the lower surface of the bed 21 of the machine, keeps said push rod 69 biased toward the cam 59. Upon the completion of the transferring motion, the mount assembly 3 is arranged as shown in dot-dash lines in Fig. 9 with the upper end of the stay 7 lying across the lower end of the leading-in wire 1 of the stem 2.

The next step in the operation of the apparatus is an advancing movement of the second welding electrode 73, located on the opposite side of the stem 2 from the transferring means 13, into welding relation to the crossed portions of the leading-in wire 1 and the stay 7. This advance of the second electrode 73 is brought about by the longitudinal movement of the plunger 74 in the bearing block 75 upon the application of compressed air to the air cylinder 76, which is connected to the end of the plunger 74 opposite from said electrode 73 by the push rod 77. The said second electrode 73 is thus moved to an extent that the leading-in wire 1 and the stay 7 are squeezed between it and the first electrode 48 carried by the transferring means. A stop in the form of the nuts 78 on the stud 79 extending from the bearing block 75 in the path of movement of the collar 80 on plunger 74 limits the advance of the second electrode 73 and prevents excessive flattening and displacement of the leading-in wire 1 and the stay 7 when the weld is made.

Both the advance of the electrode 73 and the application of welding current to the electrodes 48 and 73, which is the immediately following step in the operation of the apparatus, are timed by cams located on the main drive shaft 24 and as shown in connection with cam 81 and roller 82 of the advancing means effect operation in accordance with the position of variations in the periphery of said cams. The cam 81 performs its controlling function when a variation therein displaces the roller 82 and the lever 83 sufficiently to open the valve 84 and connect a source of compressed air to the hose 85 leading to the cylinder 76.

Full details of the means and controlling elements for supplying the welding current is not disclosed since it may have any of the well-known constructions for such apparatus. It is preferred, however, that the welding current be conducted to electrode 48 through the flexible strap 86 (Fig. 5) attached to and coiled around the end of shaft 46, and to electrode 73 through the flexible cable 87 and the clamp 88 on the forward end of the plunger 74. Means are provided for keeping the welding current introduced in electrode 73 from the base 21 of the machine by mounting the bearing 75 and the cylinder 76 upon a plate 89 of insulating material over the extension 90 of said base 21.

When the weld has been made, the transferring means 13 and the electrode 73 swing outward and retract, respectively, to positions away from the mount assembly 3 and clear of the path of movement of the now partially assembled mount to the next work station. The return swing of the transferring means 13 is preceded by an opening movement of the movable jaw 44 thereof to cause the stay 7 to be released by said means 13 and is effected by a pivotal movement of the lever 53 about pin 56 causing the end of the stud 91 on the upright arm thereof to press against the roller 50 on the jaw 44. The lever 53 pivots back to its original position only after the jaws 43 and 44 of the transferring means 13 have moved sufficiently to be clear of the stay 7 and while the roller 50 is still engaged by the stud 91. The limit of swing of the transferring means 13 is reached when it is properly arranged opposite the end of the mount assembly advancing means as indicated by the engagement of the heel 64 of the transfer arm 45 with the stationary stop screw 65. The cycle of operation of the transferring means 13 is completed by a second pivotal movement of the lever 53 which carried the end of the stud 49 against the roller 50 of the movable jaw 44 in order to open said jaw 44 to prepare said means 13 to receive another mount assembly 3.

The retraction of the welding electrode 73, on the other hand, is effected by the regulation of the valve 84 under influence of the cam 81 so that the connection to the cylinder 76 is vented to the atmosphere and an internal spring (not shown) therein can pull the plunger 74 and the welding electrode 73 back and away from the leading-in wire 1. The limit of movement of the plunger 74 is determined by the engagement of the collar 80 thereon with the head of the stud 79 on the bearing block 75.

The next steps in the manufacture performed by the apparatus are brought about after the stem 2 has been advanced to station B by the periodic indexing movement of the carrier, and are the first steps in the making of the brace 4 for holding the mount assembly 3 in place in the completed lamp. These next steps provide for the advance of an end portion of a wire 92 (Figs. 1 and 11) from a position to one side of station B to a position across the angular lower end 8 of the stay 7, for the welding of said portion to said end 8 and, finally, for the severance of said welded portion from the main body of wire 92. On completion of the above operations, a length of wire suitable for reshaping into the brace 4 becomes a part of the stay assembly 3.

The advance of the stem 2 to station B initiates the first operation having to do with attachment of the brace wire 92 to the stay 7 by causing an intermediate portion of said stay 7 to pass between the outwardly flared ends of the guides 93 and 94 and then between more closely spaced portions thereof which position it directly in the path of movement of the stem 2. The guides 93 and 94 are fixed members mounted upon an upstanding support bracket 95, located at the adjacent edge portion of the base 21, by means of the fitting 96 and the interconnected rods 97 and 98, respectively.

When the index is complete, the bent end 8 of the stay 7 has advanced along the path of movement to a position just beyond the die 99 of the means 100 (Fig. 1) for feeding the wire 92 and the end of said wire 92 is advanced end-foremost out of the die 99 to the position it appears in Fig. 11. Inasmuch as the wire feeding means 100 may be any of the well-known wire feeding means as, for instance, that disclosed in Patent 1,661,866, Zabel, dated March 6, 1928, and assigned to assignee of the present invention, said means 100 and the supply spool 101 from which said wire 92 is drawn is not shown in full detail. It is desirable, however, that feeding means of this kind be operated from the lay shaft 102 shown in part incorporated in the back end of the feeding means 100, and driven from the drive shaft 24 through the sprockets 103, 104 and the interconnecting chain indicated at 105, to effect the properly timed operation thereof. The end of the wire 92 advanced beyond the bent end 8 of the stay 7 may retain some of the set which it has received from being placed upon the spool 101 so that it tends to curl back toward station A and against the inner surface of the converging sides of the V-shaped guide 106. In such instances, the wire 92 will be directed to the proper straight across position by the guide 106. The far side (Fig. 11) of the guide 106, which is mounted at a fixed position upon the support rod 97, is not closed so that said wire 92 can advance without interference in the subsequently occurring index of the stem 2 and mount 3.

After the wire 92 has been arranged properly with respect to the bent end of the stay 7, said wire 92 and said stay 7 are welded together by the movement of electrodes 107 and 108 into clamping arrangement with the crossed over portions thereof. The electrodes 107 and 108 move against the stay 7 and wire 92 from a direction perpendicular to the bent end 8 of said stay 7 and the wire 92 in order not to alter the position thereof and, accordingly, must take positions below and above, respectively, and in the path of the indexed motion of the stay 7. The electrode 107 is advanced end-foremost from below the path by the entrance of compressed air into the cylinder 109 and the longitudinal movement effected in the plunger 110, which supports said electrode 107, by the displacement of a piston (not shown) in said cylinder 109 and the intermediate push rod 111. At the limit of the movement of the electrode 107, the collar 112 bears against the nuts 113 on the stud 114 extending from the plunger supporting bearing 115. The means for moving electrode 107 is an essential duplication of the means provided for electrode 73 at station A and is supplied with compressed air at the same time as said means by the control valve 84 inasmuch as both electrodes 73 and 107 are advanced at the same moment in the operative cycle.

The upper electrode 108 at station B which is mounted upon an arm 116 extending from the shaft 117 is moved into welding position from a location both obliquely above and outward to the side of the path of movement of the stay 7 between stations A and B and takes these motions from longitudianl and rotative movements of the shaft 117. As diagrammatically shown in Fig. 10, the opposite end of shaft 117 from the arm 116 is held by a lever 118 having a forked end entering into a channel around the full diameter thereof and is subject to being moved longitudinally in accordance with the advance of variations in the periphery of the cam 119 on the lay shaft 102 into engagement with the roller 120 on said lever 118. The electrode 108 and the arm 116 are first shifted outwardly from the support plate 95, the means of retaining the adjacent end of the shaft 117, by the passage of the roller 120 into the hollow 121 in the cam 119 and the counterclockwise rotation of the lever 118 about the pivot pin 122. The rotative motion of the shaft 117 which swings the electrode 108 down to engagement with the brace wire 92 occurs when the longitudinal motion of said shaft 117 has reached a point where the roller 123 (Fig. 11), on the arm 124 at a mid-portion thereof, rides upon the thicker portion of the stationary cam 125. The biasing effect of a helical spring 126 located between a post in the end of the arm 124 and stationary part of the machine (not shown) causes the roller 123 to follow the surface of the cam 125 and turns the shaft 117 and the arm 116 back to their original positions when said shaft 117 is again retracted after the welding operation. As in the prior welding operation, the electrical current is conducted to the electrodes 107 and 108 from a source (not shown) by flexible cables 127 and 128 attached to the plunger 110 and the arm 116 respectively. During all intervals of operation the electrode 108 and arm 116 lie below the guides 93 and 94.

The final operation occurring at station B is a shearing operation which separates that portion of the brace wire 92 attached to the stay 7 from the main body of said wire 92. The shearing operation is produced by movement of the circular knife 129 across the end face of the die 99 under the impetus of the rotation of the supporting arm 130 and rod 131 therefore and, like the operations performed at work station B, is controlled by a cam 132 on the lay shaft 102. The knife 129 is moved when the raised portion 133 on one face of the cam 132 passes below the roller 134 on the operating arm 135 at the opposite end of rod 131 from the arm 130 and turns said rod 131 in opposition to the bias of the helical spring 136. Retraction of the knife 129 and the welding electrodes 107 and 108 results in the normal continuation of the rotation of the main and lay shafts 24 and 102, respectively, and clears all means from the path of movement the stem 2 and the mount assembly 3 to station C, the next step taken in the described manufacture.

The indexing movement of the carrier, which advances the mount assembly 3 to station C, moves the stem 2 along a path which causes a lower portion of the stay 7 to pass into the opening between the flared ends and then into the restricted space between the main body of the guides 137 and 138 (Figs. 1 and 12). This motion of the mount assembly 3 carries it into the operative field of the brace forming means located at station C, and positions the bent lower end 8 thereof and the brace wire 4 attached thereto laterally within said means by virtue of the directing functions of the guides 137 and 138. Operation of the forming means follows, with the jaw 139 swinging the die 140 over against one side of the brace 4 and with the slide 141 bringing the die 142 and the fingers 143 and 144 against the opposite side of said brace 4. The jaw 139 is pivoted upon shaft 145 extending between vertical outside panels of the frame 146 of the forming means and is so shaped as to swing up through the path of the indexed movement of the bent end 8 of the stay 7 and to bring the face of the die 140 down against the brace wire 4 in a direction perpendicular to the said bent end 8. The slide 141, on the other hand, moves up in ways in one side of the frame 146 of the forming means in which it is held by gibs 147 and 148 and in a straight line motion perpendicular to the bent end 8 of the stay 7. The motions of the jaw 139 and the slide 141 are, although separately controlled, timed to cause the simultaneous advance of corner ears 149 on the die 140 and the die 142. The said die 142 constitutes the end portion of a sub-slide 150 located below the plate 151 in ways in the slide 141. The die 142 projects from said slide 141 farther than normally at that time because of the expansion force of a helical spring 152 largely located within an end well in the sub-slide 150 and butting against a portion of the slide 141. The function of the dies 140 and 142 is to cause the brace wire 4 to be bent to conform to the center portion of said die 140 and the adjacent portion of the ears 149 thereof and to assist in holding said brace 4 while the end portions thereof are wiped back along the outside of said ears 149 by the continuing advance of the slide 141 and the consequent engagement of the ends of the fingers 143 and 144 thereon with said end portions of the brace. At the time of completion of the movements of the jaw 139 and the slide 141, the stop screw 153 in the former bears against the frame 146, and the heel 154 of the latter bears against the stop screw 155 in a bridge 156 mounted on the frame 146 over the ways for the slide 141.

Operation of the forming means at station C is brought about from the main drive shaft 24 by the rotation of a cam 157 effecting vertical movement of a push rod 158 and another cam (not shown) corresponding to cam 81 effecting control over a compressed air line. Variations in the periphery of the cam 157 are transmitted to a roller 159 on the end of the push rod 158, which extends upward through an opening in the base 21 of the machine to the jaw 139, and result in the proper movements in said push rod 158 and jaw 139 as the roller 159 is caused to remain against said cam 157 by the expansion force of a helical spring 160 located around the lower end of the push rod 158 and bearing against a fixed guide 161 therefor. The air cylinder 162 on the lower extent of the frame 146 provides the moving force for the slide 141 and actuates said slide 141 when compressed air is conducted thereto from the cam controlled valve (not shown) and when said compressed air is vented therefrom through said valve. A spring (not shown) enclosed within the cylinder 162, which is a commercially available product, assists in returning the slide 141 which is connected thereto by the rod 163. The operations effected in one cycle of the apparatus are completed when the dies 140 and 142 are withdrawn from the brace 4 at which time the brace 4 is so shaped that the ear indented portions will suitably engage one side of a bulb and the ends will suitably engage the opposite side of the bulb and hold the attached end of the mount assembly 3 in place therein.

Although a preferred embodiment of our invention has been disclosed, it will be understood that the invention is not to be limited to the specific construction or arrangement of parts shown, but that said parts may be widely modified within the scope and spirit of our invention as defined by the appended claims.

What we claim as new and desire to secure by Letters Patent of the United States is:

1. In a mount making machine, support means for holding at a work station a stem with a leading-in wire extending therefrom, combined transferring and welding means movable to and from a stem at the work station and comprising a supporting member carrying jaws adapted to position and grip a portion of a wire stay of a mount assembly and also carrying a welding electrode aligned with said jaws so that a portion of the said wire stay lies across the face of said electrode, a second welding electrode mounted for movement to the stem at said work station from the opposite direction from the transferring and welding means, means for moving the transferring and welding means to cause the mount assembly to be presented at proper relation to the stem and means for moving the second electrode in apposition to the first-mentioned electrode to also cause the wire stay to be welded to the leading-in wire between said electrodes, and means for operating the aforesaid moving mechanisms in timed relationship to one another.

2. In a mount making machine, support means for holding at a work station a stem with a leading-in wire extending therefrom, combined transferring and welding means movable to and from a stem at the work station and comprising a swingable arm, jaws mounted on said arm and adapted to position and grip a portion of a stay wire of a mount assembly, and a welding electrode also mounted on said arm and aligned with said jaws so that a portion of the said stay lies across the face of the electrode, a second welding electrode mounted for movement to the stem at said work station from the opposite direction from the transferring and welding means, means for swinging the said arm to cause the mount assembly to be presented at proper relation to the stem and means for moving the second electrode in apposition to the first-mentioned electrode to also cause the wire stay to be welded to the leading-in wire between said electrodes, and means for operating the aforesaid swinging means and moving means in timed relationship to one another.

3. In a mount making machine, support means for holding at a work station a stem with a leading-in wire extending therefrom, feeding means for presenting a succession of oriented mount assemblies including a stay wire at a position adjacent said work station, said feeding means having a portion at said position engaging an end of the stay, combined transferring and welding means movable to and from a position opposite the last-mentioned portion of the feeding means and a stem at said work station and comprising a movable support member carrying jaws adapted to receive and grip a portion of the wire stay of the mounted assembly engaged by said last mentioned portion of said feeding means, and a welding electrode also carried by said support member and aligned with said jaws so that a portion of said stay lies across the face of the electrode, a second welding electrode mounted for movement to the stem at said work station from the opposite direction from the transferring and welding means, means for moving the transferring means to cause a mount assembly to be presented at proper relation to the stem and means for moving the second electrode in apposition to the first-mentioned electrode to also cause the wire stay to be welded to the leading-in wire between said electrode, and means for operating the said feeding means and the several aforesaid moving means in timed relationship to one another.

4. In a mount making machine, support means for holding at a work station a stem with a leading-in wire extending therefrom, feeding means located adjacent said work station and comprising a horizontal rest for the wire stay of a mount assembly and means butting against one end of the stay for positioning the assembly, combined transferring and welding means movable to and from the stem at the work station and the rest on the feeding means and comprising a movable support member carrying jaws adapted to receive and grip a mid-portion of the stay and also carrying a welding electrode aligned with said jaws so that a portion of said stay lies across the face of the electrode, a second electrode mounted for movement to the stem at said work station from the opposite direction from the transferring and welding means, means for moving the transferring means to cause a mount assembly to be presented at proper relation to the stem and means for moving the second electrode in apposition to the first-mentioned electrode to also cause the wire stay to be welded to the leading-in wire between said electrodes, and means for operating the said feeding means and the several aforesaid moving means in timed relationship to one another.

5. In a mount making machine, support means for holding at a work station a stem with a leading-in wire extending therefrom, feeding means located adjacent said work station and comprising a member having a horizontal plane surface for supporting the wire stay of a mount assembly, guide rails on the said surface for positioning the mount assembly thereon, and means for advancing the mount assembly along the said surface to a discharge position, combined transferring and welding means movable to and from the stem at the work station and the discharge position of the feeding means and comprising a movable support member carrying jaws adapted to receive and grip a mid-portion of the stay and also carrying a welding electrode aligned with said jaws so that a portion of said stay lies across the face of the electrode, a second electrode mounted for movement to the stem at said work station from the opposite direction from the transferring and welding means, means for moving the transferring means to cause a mount assembly to be presented at proper relation to the stem and means for moving the second electrode in apposition to the first-mentioned electrode to also cause the wire stay to be welded to the leading-in wire between said electrodes, and means for operating the said feeding means and the several aforesaid moving means in timed relationship to one another.

6. In a mount making machine, support means for holding at a work station a stem with a leading-in wire extending therefrom, feeding means located adjacent said work station comprising members having spaced horizontal plane surfaces for supporting the ends of a wire stay of a mount assembly, guide rails on the said surfaces for engaging the ends of the stay and thereby positioning the mount assembly thereon, means located between the said surfaces and movable vertically and horizontally to engage and advance the mount assembly to a discharge position, combined transferring and welding means movable to and from the work station and the discharge position of the feeding means and comprising a movable arm carrying jaws adapted for arrangement between the said surfaces at the discharge position for receiving and gripping a mid-portion of the stay, a welding electrode also carried by said arm and aligned with said jaws so that a portion of said stay lies across the face of the electrode, and means for swinging said arm between the feeding means and the stem at said station, a second electrode mounted for movement to the stem at said work station from the opposite direction from the transferring and welding means, means for moving the transferring means to cause a mount to be presented at proper relation to the stem and means for moving the second electrode in apposition to the first-mentioned electrode to also cause the stay to be welded to the leading-in wire by the electrodes and means for operating the said feeding means and the several aforesaid moving means in timed relationship to one another.

7. In a mount making machine, a carrier for holding a stem having a leading-in wire extending therefrom and means for advancing the carrier and stem along a path of movement to a succession of work stations, means at one of said stations for supporting a mount assembly including a stay with a laterally extending end portion and lying substantially wholly within a horizontal plane to one side of the said path of movement, means at said one work station for transferring said mount assemby to a properly oriented position with an end portion of the stay extending across the leading-in wire of the stem, said transfer means comprising a movable support member carrying jaws adapted to grip and retain the stay of the mount assembly and also carrying a welding electrode aligned with the said jaws so that the said end portion of the stay lies across the face of said electrode, and a second electrode movable to the stem at said one work station from the opposite side of the said path of movement from the transfer means and into engagement with the portions of the stay and the leading-in wire adjacent the first-mentioned electrode for welding them together, means for moving the said support member as aforesaid, means for moving the said second electrode as aforesaid, and means for operating the aforesaid carrier advancing means and the several moving means in timed relationship to one another.

8. In a mount making machine, a carrier for holding a stem having a leading-in wire extending therefrom and means for advancing the carrier and stem along a path of movement to a succession of work stations, means at one of said stations for supporting a mount assembly including a stay with a laterally extending end portion and lying substantially wholly within a horizontal plane to one side of the said path of movement, means at said one work station for transferring said mount assembly to a properly oriented position with relation to the leading-in wire of the stem, said transfer means comprising movable jaws adapted to grip and retain the stay of the mount assembly, electrodes movable to said one work station from opposite sides of the plane of movement and into engagement with the adjacent portions of the stay and the leading-in wires for welding them together, means located at a second work station for directing a wire brace end foremost from a position to one side of the said path of movement to a position across the laterally extending end portion of the stay, a pair of electrodes, at least one of which lies to one side of the said path of movement and the stay, movable into said path at the said second work station and into engagement with the adjacent portions of the stay and brace to weld them together, and means for operating the several aforesaid means and electrodes in proper time relation.

9. In a mount making machine, a carrier for holding a stem having a leading-in wire extending therefrom and means for advancing the carrier and stem along a path of movement to a succession of work stations, means at one of said stations for supporting a mount assembly including a stay with a laterally extending end portion and lying substantially wholly within a horizontal plane to one side of the said path of movement, means at said one station for transforming said mount assembly to a properly oriented position with relation to the leading-in wire of the stem, said transfer means comprising movable jaws adapted to grip and retain the stay of the mount assembly, electrodes movable to said one work station from opposite sides of the said path of movement and into engagement with the adjacent portions of the stay and the leading-in wires for welding them together, means located at a second work station for directing a wire brace end foremost from a position to one side of the said path of movement to a position across the laterally extending end portion of the stay, means for welding the stay and brace together comprising an electrode, means for moving said electrode upward into the side path of movement to a welding position adjacent said stay, a second electrode, an arm for supporting the second electrode and means for moving said arm and electrode to and from the said path of movement and the stay and for turning said arm to move said second electrode to a welding position, and means for operating the several aforesaid means and electrodes in proper time relation.

10. In a mount making machine, a carrier for holding a stem having a leading-in wire extending therefrom and means for advancing the carrier and stem along a path of movement to a succession of work stations, means at one of said stations for transferring a mount assembly including a stay to the proper relation to the leading-in wire of the stem, electrodes movable into engagement with adjacent portions of the stay and the leading-in wire to weld them together, means located at a second station taken by the stem for advancing a wire brace laterally through the path of travel of a stay carried by said stem and to a position across a portion of the stay, a pair of electrodes movable into engagement with the adjacent portions of the stay and brace at the second station to weld them together, bending dies at a third station taken by the stem, means for moving the bending dies into engagement with the brace for forming it, and means for operating the several aforesaid means at all three stations in proper time relation.

11. In a mount making machine, a carrier for holding a stem having a stay extending therefrom and means for advancing the carrier and stem to a succession of work stations, guides located at one of the stations in a position to engage the stay held by said carrier and direct it into a predetermined plane during movement of the carrier and stem to said station, means located at said station for advancing a wire brace through said plane to a position across a portion of the stay, a pair of electrodes, at least one of which is located to one side of said plane, and means for moving the said one electrode into said plane and for thereafter moving both of said electrodes to engagement with the adjacent portions of the stay and brace to weld them together, and means for operating the aforesaid advancing means and moving means in timed relationship to one another.

12. In a mount making machine, a carrier for holding a stem having a stay extending therefrom and means for advancing the carrier and stem to a succession of work stations, guides located at one of the stations in a position to engage the stay held by said carrier and direct it into a predetermined plane during movement of the carrier and stem to said station, means located at said station for advancing a wire brace through said plane to a position across a portion of the stay, and means for welding the stay and brace together comprising an electrode located in said plane below the path of movement of the stay held by said carrier, means for moving the electrode upward in the said plane to a welding position, a second electrode located to one side of said plane, an arm for supporting the second electrode and a shaft extending transverse to said plane for supporting the arm and movable longitudinally to move said arm and said electrode into said plane and rotatable to swing said arm and said electrode to a welding position, and means for operating the aforesaid advancing means and moving means in timed relationship to one another.

13. In a mount making machine, a carrier for holding a stem having a stay extending therefrom and means for advancing the carrier and stem to a succession of work stations, guides located at one of the stations in a position to engage the stay held by said carrier and direct it into a predetermined plane during movement of the carrier and stem to said station, means located at said station for advancing a wire brace through said plane to a position across a portion of the stay, a stationary guide located on the opposite side of the said plane from, and ahead of the brace advancing means, for preventing the end of the brace from being displaced in a direction from which the carrier and stem is advanced, a pair of electrodes, at least one of which is located to one side of said plane, and means for moving the said one electrode into said plane and for thereafter moving both of said electrodes to engagement with the adjacent portions of the stay and brace to weld them together, and means for operating the aforesaid advancing means and moving means in timed relationship to one another.

14. In a mount making machine of the character described, the combination of a carrier for holding a stem having a leading-in wire extending therefrom and means for advancing the stem and carrier along a path of movement to a succession of work stations, transferring and welding means located at one side of said path of movement at one of said stations and comprising an arm mounted for pivotal movement from a horizontal to a vertical position and having thereon a pair of jaws and spring means holding said jaws in a normally closed position, a welding electrode mounted on said arm in alignment with said jaws so that a wire stay gripped by said jaws extends across the face of said electrode, means for feeding stays periodically to said transferring and welding means comprising a table so located that said arm in its horizontal position extends alongside one end of the table, and means for advancing the stays along said table toward said one end thereof and individually into the said jaws, means for pivoting said arm to a vertical position to bring said electrode and the adjacent portion of said stay to a position contiguous to the leading-in wire of the stem in said carrier, a second welding electrode mounted at said one station on the side of said path of movement opposite that occupied by said transferring and welding means, means for advancing said second electrode toward the said leading-in wire in apposition to the first-mentioned electrode to cause the said stay and leading-in wire to be welded together, means to effect temporary opening of said jaws to receive a stay therebetween when the said arm is in its horizontal position, and means to effect temporary opening of said jaws to release said stay when the said arm is in its vertical position, and means for operating the various moving means, advancing means and feeding means in timed relationship to one another.

15. In a mount making machine of the character described, the combination of a carrier for holding upright a stem having a leading-in wire depending therefrom and means for advancing the stem and carrier along a path of movement to a succession of work stations, transferring and welding means located at one side of the path of movement at one of said stations and comprising an arm mounted for pivotal movement from a horizontal to a vertical position and having thereon a pair of jaws and a welding electrode mounted on said arm in alignment with said jaws so that a wire stay gripped by said jaws extends across the face of said electrode, means for feeding stays individually to said jaws with the stays arranged to be gripped adjacent a proximate end thereof by said jaws and to extend horizontally in alignment with said arm toward its pivot point and with an angularly offset remote end of the stay arranged to lie substantially in a horizontal plane, means for pivoting said arm to a substantially vertical position to bring said electrode and the adjacent portion of said stay to a position contiguous to the leading-in wire of the stem in said carrier and with the offset end of the stay substantially in the vertical plane through the said path of movement of the stem and carrier, a second welding electrode mounted at said one station on the side of said plane opposite that occupied by said transferring and welding means, means for advancing said second electrode toward the said leading-in wire in apposition to the first-mentioned electrode to cause the said stay and leading-in wire to be welded together, a brace mounting mechanism located at a second station occupied by said stem and carrier and comprising means for advancing a wire brace horizontally through the said vertical plane through the path of movement of the stem and across the offset end of the stay carried thereby, said brace mounting means further including welding means comprising an electrode located in said vertical plane below the path of movement of the stay and a second electrode located to one side of said plane, means for moving the first-mentioned electrode generally upward in said plane toward said stay and brace and means for moving said second electrode into said plane and thence in apposition to the first-mentioned electrode to cause the brace and stay to be welded together, and means for operating the various advancing means, moving means and feeding means in timed relationship to one another.

16. In a mount making machine of the character described, the combination of a carrier for holding upright a stem having a leading-in wire depending therefrom and means for advancing the stem and carrier along a path of movement to a succession of work stations, transferring and welding means located at one side of the path of movement at one of said stations and comprising an arm mounted for pivotal movement from a horizontal to a vertical position and having thereon a pair of jaws and a welding electrode mounted on said arm in alignment with said jaws so that a wire stay gripped by said jaws extends across the face of said electrode, means for feeding stays individually to said jaws with the stays arranged to be gripped adjacent a proximate end thereof by said jaws and to extend horizontally in alignment with said arm toward its pivot point and with an angularly offset remote end of the stay arranged to lie substantially in a horizontal plane, means for pivoting said arm to a substantially vertical position to bring said electrode and the adjacent portion of said stay to a position contiguous to the leading-in wire of the stem in said carrier and with the offset end of the stay substantially in the vertical plane through the said path of movement of the stem and carrier, a second welding electrode mounted at said one station on the side of said plane opposite that occupied by said transferring and welding means, means for advancing said second electrode toward the said leading-in wire in apposition to the first-mentioned electrode to cause the said stay and leading-in wire to be welded together, and means for operating the various advancing means, moving means and feeding means in timed relationship to one another.

References Cited in the file of this patent

UNITED STATES PATENTS

| | | |
|---|---|---|
| 1,639,688 | Duncan | Aug. 23, 1927 |
| 1,733,881 | Illingworth | Oct. 29, 1929 |
| 1,920,630 | Conn | Aug. 1, 1933 |
| 2,114,844 | Krause | Apr. 19, 1938 |
| 2,135,288 | Koenig | Nov. 1, 1938 |
| 2,297,950 | Flaws | Oct. 6, 1942 |
| 2,327,033 | Flaws | Aug. 17, 1943 |
| 2,434,165 | Juvinall | Jan. 6, 1948 |
| 2,472,778 | Quinn | June 7, 1949 |